US010654566B2

(12) United States Patent
Waldo et al.

(10) Patent No.: US 10,654,566 B2
(45) Date of Patent: May 19, 2020

(54) INTEGRATED MAIN ROTOR HUB AND SHAFT (71) Applicant: SIKORSKY AIRCRAFT CORPORATION, Stratford, CT (US)

(72) Inventors: Ron William Waldo, North Richland Hills, TX (US); Eric Lucien Nussenblatt, Stamford, IL (US); David H. Hunter, Cheshire, CT (US); Bryan Kenneth Baskin, Arlington, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 428 days.

(21) Appl. No.: 15/508,585

(22) PCT Filed: Sep. 28, 2015

(86) PCT No.: PCT/US2015/052608
§ 371 (c)(1),
(2) Date: Mar. 3, 2017

(87) PCT Pub. No.: WO2016/057255
PCT Pub. Date: Apr. 14, 2016

(65) Prior Publication Data
US 2017/0297688 A1 Oct. 19, 2017

Related U.S. Application Data (60) Provisional application No. 62/056,877, filed on Sep. 29, 2014.

(51) Int. Cl.
B64C 27/10 (2006.01)
B64C 27/32 (2006.01)
B64C 27/48 (2006.01)

(52) U.S. Cl.
CPC .............. *B64C 27/10* (2013.01); *B64C 27/32* (2013.01); *B64C 27/48* (2013.01)

(58) Field of Classification Search
CPC .......... B64C 27/10; B64C 27/32; B64C 27/48
(Continued)

(56) References Cited

U.S. PATENT DOCUMENTS 2,461,348 A * 2/1949 Pentecost ................ B64C 27/10
244/17.23
2,847,173 A * 8/1958 McCarty, Jr. ......... B64C 39/026
244/17.11

(Continued)

OTHER PUBLICATIONS

Notification of Transmittal of the International Search Report for International Application No. PCT/US15/52608 dated Feb. 19, 2016; dated Mar. 4, 2016; 11 pages.
(Continued)

*Primary Examiner* — Samir Abdosh
(74) *Attorney, Agent, or Firm* — Cantor Colburn LLP (57) ABSTRACT

A main rotor system for a rotary wing aircraft is provided including a lower rotor hub to which lower rotor blades are attachable. The lower rotor hub rotates about an axis in a first direction. A hollow rotor shaft extends through the lower rotor hub. The first end of the rotor shaft couples to a component of the rotary wing aircraft for rotation about an axis. An upper rotor hub arranged at the second end of the rotor shaft includes a plurality of similar upper rotor members equidistantly spaced about a circumference of the rotor shaft to form an open center aligned with a hollow interior of the rotor shaft. An opening configured to receive an upper rotor blade is formed between adjacent upper rotor members and the upper rotor hub is configured to rotate in a second direction, opposite the first direction.

12 Claims, 5 Drawing Sheets

(58) Field of Classification Search
USPC .................. 244/17.23, 17.11, 17.19, 17.21
See application file for complete search history.

(56) References Cited

U.S. PATENT DOCUMENTS

| | | | | |
|---|---|---|---|---|
| 3,188,884 A * | 6/1965 | Bancroft | ................. | B64C 27/10 |
| | | | | 74/665 K |
| 3,504,989 A | 4/1970 | Kisovec | | |
| 3,591,310 A | 7/1971 | Mouille | | |
| 3,972,491 A * | 8/1976 | Ferris | ...................... | B64C 27/32 |
| | | | | 244/17.27 |
| 4,425,082 A * | 1/1984 | Mussi | ................... | B64C 27/32 |
| | | | | 416/134 A |
| 6,293,492 B1 * | 9/2001 | Yanagisawa | ............ | B64C 27/10 |
| | | | | 244/17.23 |
| 6,296,444 B1 | 10/2001 | Schellhase et al. | | |
| 7,229,251 B2 | 6/2007 | Bertolotti et al. | | |
| 7,438,259 B1 | 10/2008 | Piasecki et al. | | |
| 7,621,480 B2 * | 11/2009 | Darrow, Jr. | ............... | B64C 1/00 |
| | | | | 244/130 |
| 2006/0269411 A1 * | 11/2006 | Bertolotti | ................. | B64C 1/00 |
| | | | | 416/134 A |
| 2007/0181741 A1 * | 8/2007 | Darrow, Jr. | ............... | B64C 1/00 |
| | | | | 244/17.23 |
| 2008/0056897 A1 * | 3/2008 | Anderson | ............. | B64C 27/021 |
| | | | | 416/128 |
| 2008/0131280 A1 * | 6/2008 | Krauss | .................... | B64C 27/10 |
| | | | | 416/131 |
| 2009/0084891 A1 * | 4/2009 | Darrow, Jr. | ................ | B64C 7/00 |
| | | | | 244/17.19 |
| 2012/0156033 A1 * | 6/2012 | Cowles | ................... | B64C 27/10 |
| | | | | 416/1 |
| 2013/0224022 A1 * | 8/2013 | Cabrera | .................. | B64C 27/48 |
| | | | | 416/134 A |
| 2014/0271200 A1 * | 9/2014 | Sutton | ..................... | B64C 27/32 |
| | | | | 416/134 A |
| 2015/0060596 A1 * | 3/2015 | Garcia | ................... | B64D 35/06 |
| | | | | 244/17.23 |
| 2016/0375995 A1 * | 12/2016 | Waldo | .................... | B64C 27/32 |
| | | | | 416/204 R |
| 2017/0210463 A1 * | 7/2017 | Koessick | ................ | B64C 27/10 |

OTHER PUBLICATIONS

Written Opinion of the International Searching Authority for International Application No. PCT/US15/52608 dated Feb. 19, 2016; dated Mar. 4, 2016; 7 pages.

* cited by examiner

INTEGRATED MAIN ROTOR HUB AND SHAFT

CROSS REFERENCE TO RELATED APPLICATIONS

This application is a National Stage application of PCT/US2015/052608, filed Sep. 28, 2015, which claims the benefit of U.S. Provisional Application No. 62/056,877, filed Sep. 29, 2014, both of which are incorporated by reference in their entirety herein.

BACKGROUND OF THE INVENTION

Exemplary embodiments of the invention generally relate to rotary wing aircrafts, and more particularly, to a rotor hub and shaft of rotary wing aircraft.

A helicopter rotor hub is the primary structural assembly for driving torque to each rotor blade, balancing centrifugal loads between opposing rotor blades, and transferring lift loads to the aircraft fuselage. Conventional rotor hub assemblies require a plurality of cones to center the rotor hub, a large shaft nut to retain the hub at the end of the rotor shaft, and additional components to prevent loosening of the shaft nut during operation of the rotary wing aircraft. Although these systems perform adequately, it is always desirable to reduce the empty weight of the helicopter.

In addition, a counter-rotating rotary wing aircraft has controls and components, such as pitch control rods for example, arranged within the hollow interior of the upper rotor shaft. When a conventional rotor hub is used in the counter-rotating rotary wing aircraft, a large opening is generally machined into the hub to provide access and/or visual inspection of the components within the upper rotor shaft.

BRIEF DESCRIPTION OF THE INVENTION

According to one embodiment of the invention, a main rotor system for a rotary wing aircraft is provided including a lower rotor hub to which one or more lower rotor blades are attachable. The lower rotor hub rotates the lower rotor blades about an axis in a first direction. A hollow rotor shaft having a first end and a second end extends through the lower rotor hub. The first end of the rotor shaft is configured to couple to a component of the rotary wing aircraft for rotation about an axis. An upper rotor hub is arranged at the second end of the rotor shaft. The upper rotor hub includes a plurality of similar upper rotor members integrally formed with the second end and equidistantly spaced about a circumference of the rotor shaft such that the upper rotor hub has an open center aligned with a hollow interior of the rotor shaft. An opening configured to receive an upper rotor blade is formed between adjacent upper rotor members and the upper rotor hub and rotor shaft are configured to rotate the upper rotor blade in a second direction, opposite the first direction.

In addition to one or more of the features described above, or as an alternative, in further embodiments a transition between the rotor shaft and the integrally formed upper rotor members includes a smooth curve.

In addition to one or more of the features described above, or as an alternative, in further embodiments each of the plurality of upper rotor members includes a central portion connecting a first arm extending outwardly from the axis in a third direction and a second arm extending outwardly from the axis in a fourth direction.

In addition to one or more of the features described above, or as an alternative, in further embodiments the third direction and the fourth direction are perpendicular.

In addition to one or more of the features described above, or as an alternative, in further embodiments the opening configured to receive an upper rotor blade is formed between a first arm of a first upper rotor member and a second arm of a second, adjacent upper rotor member, the first arm of the first upper rotor member and the second arm of the second upper rotor member being arranged parallel to one another.

In addition to one or more of the features described above, or as an alternative, in further embodiments the central portion of each upper rotor member includes a first surface including at least one attachment hole for mounting a component, the first surface being parallel to the axis.

In addition to one or more of the features described above, or as an alternative, in further embodiments a structural component is mounted to an upper surface of the upper rotor hub.

In addition to one or more of the features described above, or as an alternative, in further embodiments the central portion of each upper rotor member includes a first surface having at least one attachment hole for connecting the structural component to the upper rotor hub, the first surface being arranged perpendicular to the axis.

In addition to one or more of the features described above, or as an alternative, in further embodiments a wall thickness of the hollow rotor shaft is substantially reduced.

In addition to one or more of the features described above, or as an alternative, in further embodiments the upper rotor hub includes four upper rotor members and is configured to receive four upper rotor blades.

According to another embodiment of the invention, a rotary wing aircraft is provided including an airframe and a main rotor system. The main rotor system includes a lower rotor hub to which one or more lower rotor blades are attachable. The lower rotor hub rotates the lower rotor blades about an axis in a first direction. A hollow rotor shaft having a first end and a second end extends through the lower rotor hub. The first end of the rotor shaft is configured to couple to a component of the rotary wing aircraft for rotation about an axis. An upper rotor hub is arranged at the second end of the rotor shaft. The upper rotor hub includes a plurality of similar upper rotor members integrally formed with the second end and equidistantly spaced about a circumference of the rotor shaft such that the upper rotor hub has an open center aligned with a hollow interior of the rotor shaft. An opening configured to receive an upper rotor blade is formed between adjacent upper rotor members and the upper rotor hub and rotor shaft are configured to rotate the upper rotor blade in a second direction, opposite the first direction.

In addition to one or more of the features described above, or as an alternative, in further embodiments each of the plurality of upper rotor members includes a central portion connecting a first arm extending outwardly from the axis in a third direction and a second arm extending outwardly from the axis in a fourth direction.

In addition to one or more of the features described above, or as an alternative, in further embodiments the opening configured to receive each upper rotor blade assembly is formed between a first arm of a first upperrotor member and a second arm of a second, adjacent upper rotor member, the first arm of the first upper rotor member and the second arm of the second upper rotor member being arranged parallel to one another.

In addition to one or more of the features described above, or as an alternative, in further embodiments a structural component is mounted to a portion of each of the upper rotor members of the upper rotor hub.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
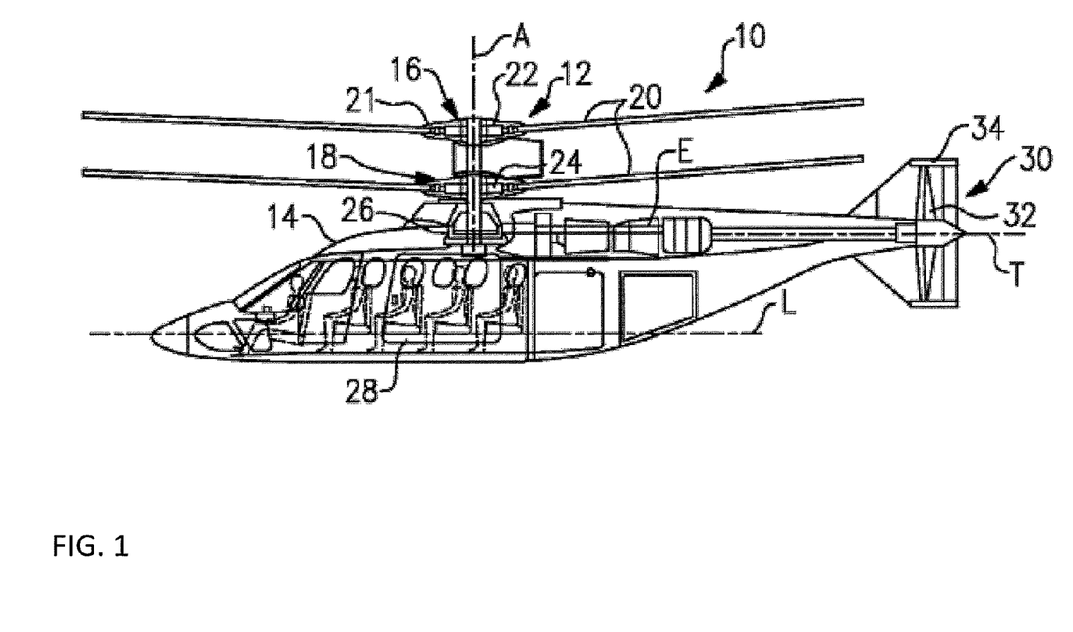
FIG. 1 is a cross-sectional view of an example of a counter-rotating rotary wing aircraft.
Figure 2:
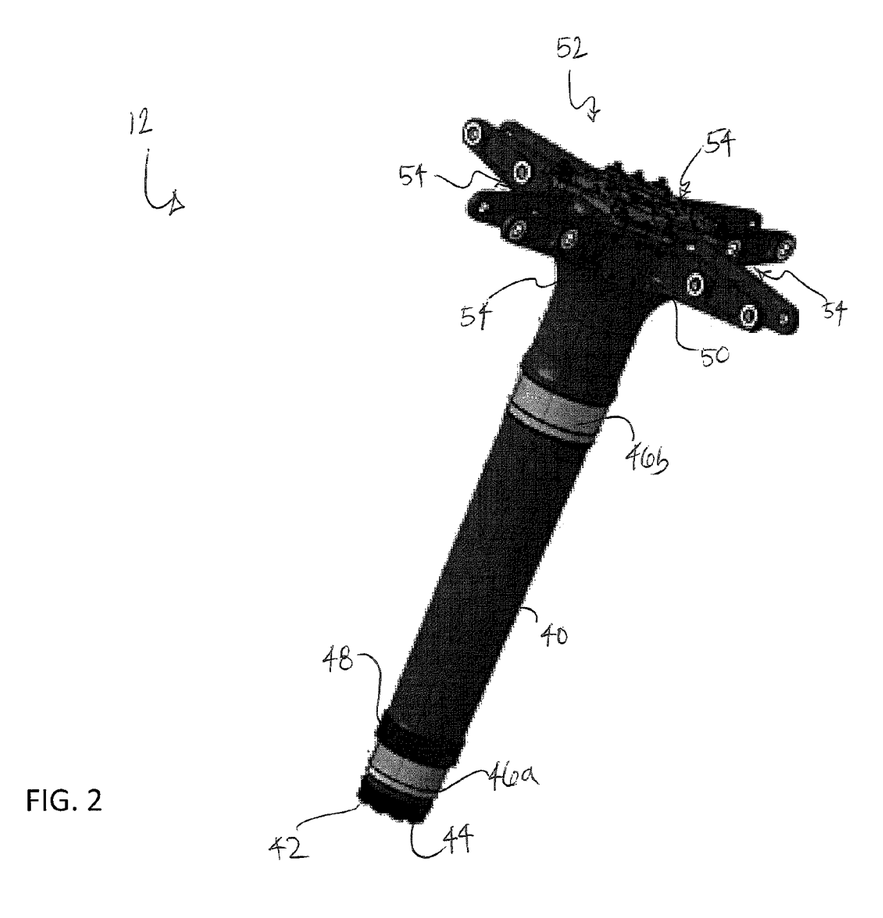
FIG. 2 is a perspective view of a portion of the main rotor shaft assembly of a rotary wing aircraft according to an embodiment of the invention.

FIG. 1 illustrates an exemplary vertical takeoff and landing (VTOL) aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24, respectively. Any number of rotor blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in this illustrated non-limiting embodiment, it should be understood that any such system or other translational thrust systems may alternatively or additionally be utilized.

Referring now to FIGS. 2-5, a portion of the main rotor system 12 is provided in more detail. The main rotor system 12 includes a rotor shaft 40 having a mast nut lock constellation 44 mounted at a first end 42 thereof. The mast nut lock constellation 44 is configured to couple the rotor shaft 40 to another component of the aircraft 10, such as the main gearbox 26 for example. A first bearing 46a and a second bearing 46b, are arranged about the shaft 40 and are separated from one another by a distance. The bearings 46 are configured to interface with a non-rotating component, including, but not limited to a non-rotating housing structure in a single or co-axial helicopter, or a rotating shaft or a standpipe in a co-axial embodiment. An example of a standpipe could be the stationary standpipe disposed between rotating elements, such as that shown in U.S. patent application Ser. No. 14/071,987, the disclosure of which is incorporated by reference. As illustrated, a plurality of splines 48 are arranged about a circumference of the shaft 40 adjacent the first bearing 46a. The plurality of splines 48 are intended to couple another component (not shown) to the shaft 40 for rotation about axis A. Examples of bearings usable include journal bearings, roller bearing, or any other bearing that support and/or react shear, thrust and moment singly or in combination.

Figure 3:
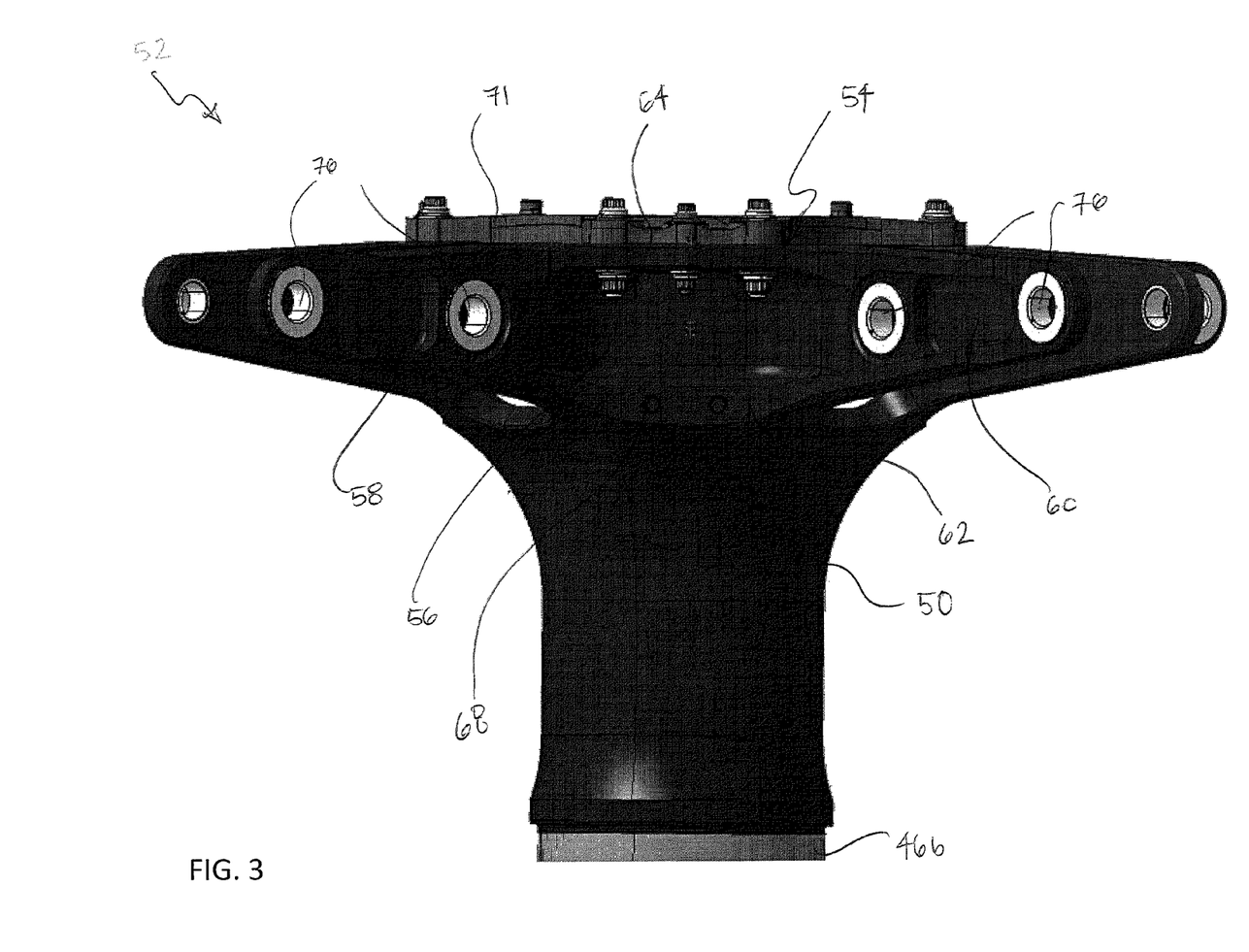
FIG. 3 is a side view of a main rotor shaft of a rotary wing aircraft according to an embodiment of the invention.
Figure 4:
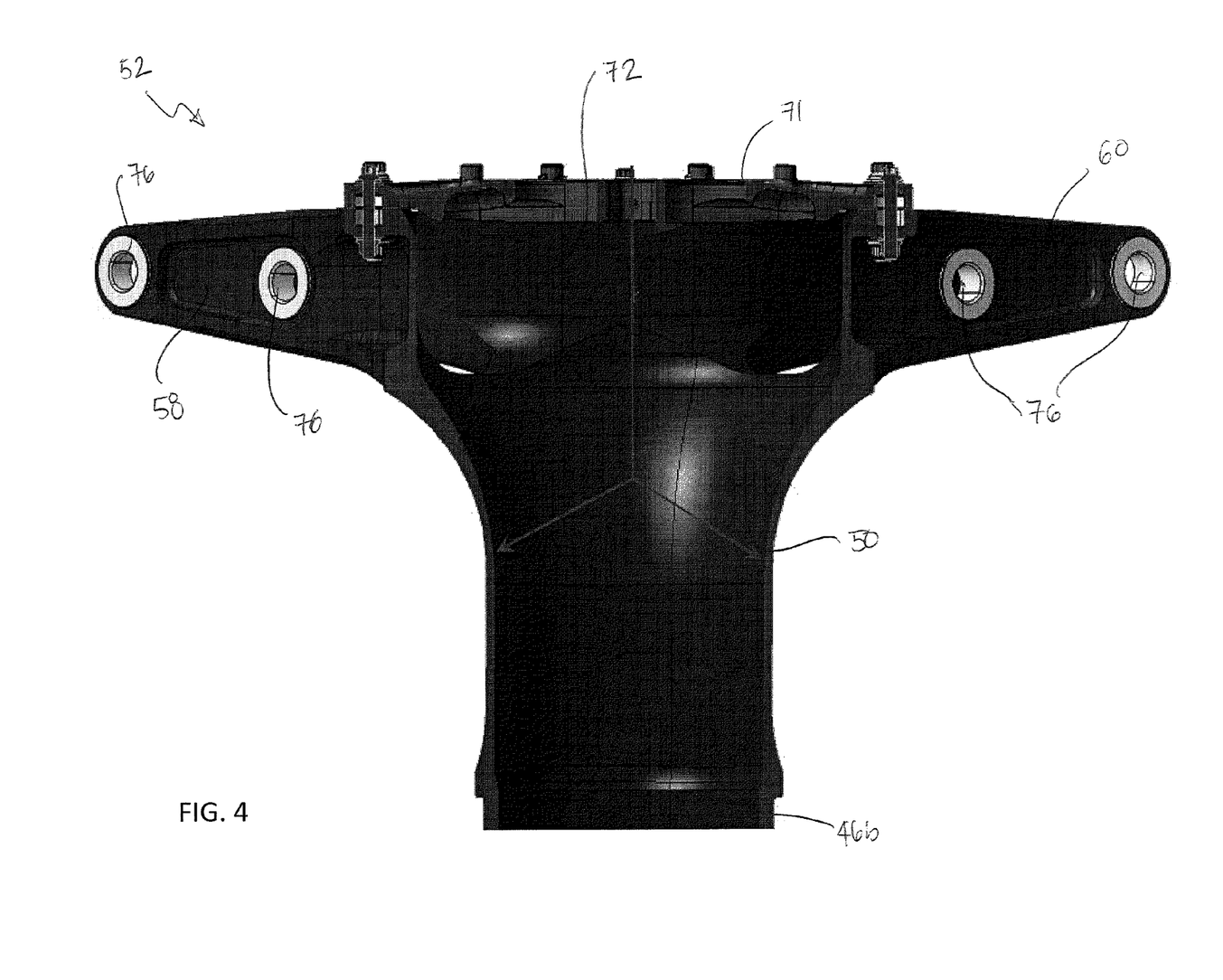
FIG. 4 is a cross-sectional view of the main rotor shaft of FIG. 3 according to an embodiment of the invention.
Figure 5:
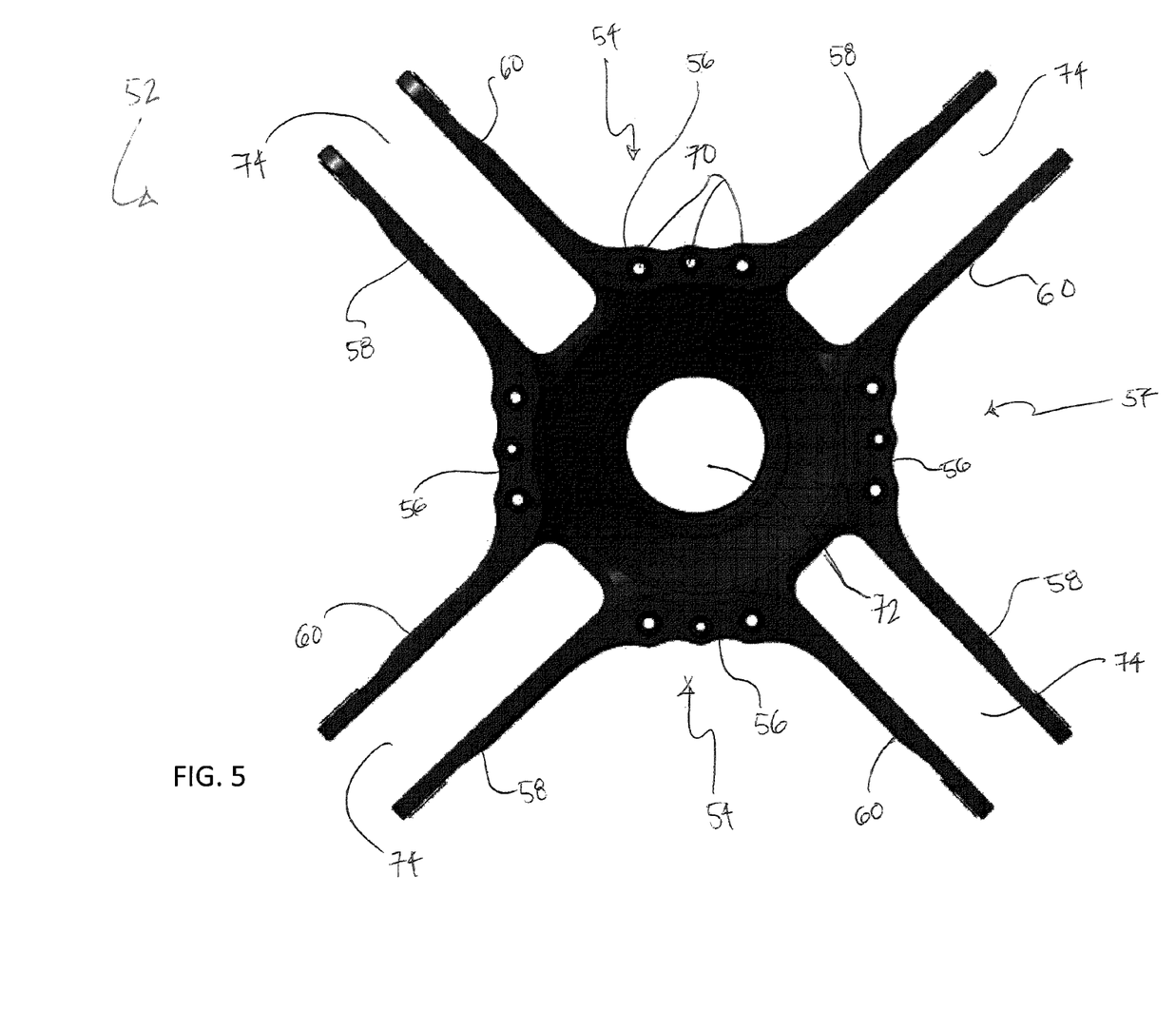
FIG. 5 is a top view of an assembled plate and open rotor hub of a rotary wing aircraft according to an embodiment of the invention.

Arranged at a second, opposite end 50 of the rotor shaft 40 is a rotor hub 52 formed from a plurality of similar rotor members 54 integrally formed with the shaft 40. As shown in FIGS. 3 and 4, the transition between the second end 50 of the shaft 40 and the rotor hub 52 generally includes a smooth curve. Such a curve could be defined by one or more radii, such as with a single radius, a compound radius, or elliptical radii.

Each rotor member 54 includes a central portion 56 connecting a first arm 58 extending outwardly from the axis of rotation A in a first direction and a second arm 60 extending outwardly from the axis of rotation A in a second direction. In the illustrated, non-limiting embodiment, the first arm 58 and the second arm 60 extend substantially perpendicular to one another. The central portion 56 of each rotor member 54 includes a first planar surface 62 and a second planar surface 64 configured to connect a plurality of components to the rotor hub. As shown, each first planar surface 62 may extend generally parallel to axis A and includes at least one first attachment opening 68 configured to couple the rotor member to a component, such as an aerodynamic fairing for example. The second planar surface 64 of each rotor member 54 is oriented perpendicular to axis A and includes one or more second attachment openings 70 configured to connect a structural component 71, such as a hub plate (FIGS. 2-4) for example, to the upper surface of the rotor hub 52. The structural component 71 is intended to provide additional strength and rigidity to the rotating interface. While shown as detachable, it is understood that the structural component 71 could be permanently attached and/or integrally formed with the hub 52 in other embodiments.

The plurality of rotor members 54 are spaced equidistantly about the circumference of the second end of the rotor shaft 40 such that the rotor hub 52 includes a substantially open center 72. The center 72 is connected to the hollow interior of the rotor shaft 40 for access to any components positioned within the rotor shaft 40. As a result of the positioning of the plurality of rotor members 54, an opening 74 is formed between the generally parallel first arm 58 and the second arm 60 of adjacent rotor members 54. A rotor blade, such as blade 20, is configured to mount within each of the openings 74 using mounting hardware connected to holes 76 formed in the adjacent first and second arms 58, 60. The number of openings 74 formed in the rotor hub 52, and therefore the number of rotor blades 20 that the hub 52 is configured to receive is substantially equal to the number of rotor members 54 that form the rotor hub 52. In the illustrated, non-limiting embodiment, the rotor hub 52 includes four rotor members 54 integrally formed with the second end 50 of the rotor shaft 40. However, other configurations of the rotor hub 52 having any number of rotor members 54, or configured to receive any number of rotor blades 20 are within the scope of the invention. Though the rotor shaft 40 and rotor hub 52 are illustrated as an upper rotor shaft 12U and rotor hub 22 of a counter-rotating main rotor system 12, other rotary wing aircrafts 10 having a main rotor system with a single shaft and hub are within the scope of the invention.

By integrally forming the rotor hub 52 and the rotor shaft 40, the weight, size, and stress concentrations of the component are reduced. For example, the overall wall thickness of the shaft 40 and the overall height profile of the rotor hub 52 have substantially decreased. In addition, the integrally formed rotor shaft 40 and hub 52 are intended to facilitate access to and the service of components within the interior of the rotor shaft 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example, aspects could be implemented in other contra-rotating blade and/or propeller applications, including those used in fixed wing, maritime, and/or wind turbine applications. Accordingly, the invention is not to be seen as limited by the foregoing description, but is only limited by the scope of the appended claims.

What is claimed is:

1. A main rotor system for a rotary wing aircraft:
a lower rotor hub to which lower rotor blades are attachable and which rotates the lower rotor blades about an axis in a first direction;
a hollow rotor shaft passing through the lower rotor hub having a first end and a second end, the first end of the rotor shaft being configured to couple to a component of the rotary wing aircraft for rotation about the axis;
an upper rotor hub integral to the second end of the rotor shaft, the upper rotor hub including a plurality of similar upper rotor members integrally formed with the second end and equidistantly spaced about a circumference of the rotor shaft such that the upper rotor hub has an open center aligned with a hollow interior of the rotor shaft, and wherein an opening configured to receive an upper rotor blade is formed between adjacent rotor members and the upper rotor hub and rotor shaft rotate the upper rotor blade in a second direction about the axis, the second direction being opposite the first direction; and
a hub plate mounted to an upper surface of the upper rotor hub above a connection point of the upper rotor blades, wherein the hub plate seals the open center of the upper rotor hub.

2. The main rotor system according to claim 1, wherein a transition between the rotor shaft and the integrally formed upper rotor members includes a smooth curve.

3. The main rotor system according to claim 1, wherein each of the plurality of upper rotor members includes a central portion connecting a first arm extending outwardly from the axis in a third direction and a second arm extending outwardly from the axis in a fourth direction.

4. The main rotor system according to claim 3, wherein the third direction and the fourth direction are perpendicular.

5. The main rotor system according to claim 3, wherein the opening configured to receive a rotor blade is formed between a first arm of a first upper rotor member and a second arm of a second, adjacent upper rotor member, the first arm of the first upper rotor member and the second arm of the second upper rotor member being arranged parallel to one another.

6. The main rotor system according to claim 3, wherein the central portion of each upper rotor member includes a first surface including at least one attachment hole for mounting a component, the first surface being parallel to the axis.

7. The main rotor system according to claim 1, wherein the central portion of each upper rotor member includes a first surface having at least one attachment hole for connecting the structural component to the upper rotor hub, the first surface being arranged perpendicular to the axis.

8. The main rotor system according to claim 1, wherein the upper rotor hub includes four upper rotor members and is configured to receive four rotor blades.

9. A rotary wing aircraft comprising:
an airframe;
a main rotor system;
a plurality of rotor blades mounted to the main rotor system, the main rotor system including:
a lower rotor hub to which a plurality of lower rotor blades are attachable, the lower rotor hub being configured to rotate the plurality of lower rotor blades in a first direction;
a hollow rotor shaft extending through the lower rotor hub having a first end and a second end, the first end of the rotor shaft being configured to couple to a component of the rotary wing aircraft for rotation about the axis;
an upper rotor hub arranged at the second end of the rotor shaft, the upper rotor hub including a plurality of similar upper rotor members integrally formed with the second end and equidistantly spaced about a circumference of the rotor shaft such that the upper rotor hub has an open center aligned with a hollow interior of the rotor shaft, and wherein an opening configured to receive one of a plurality of upper rotor blades is formed between adjacent upper rotor members and the upper rotor hub and rotor shaft rotate the upper rotor blades in a second direction, the second direction being opposite the first direction; and
a hub plate mounted to an upper surface of the upper rotor hub above a connection point of the upper rotor blades, wherein the hub plate seals the open center of the upper rotor hub.

10. The rotary wing aircraft according to claim 9, wherein each of the plurality of upper rotor members includes a central portion connecting a first arm extending outwardly from the axis in a third direction and a second arm extending outwardly from the axis in a fourth direction.

11. The main rotor system according to claim 9, wherein the opening configured to receive each upper rotor blade is formed between a first arm of a first upper rotor member and a second arm of a second, adjacent upper rotor member, the first arm of the first upper rotor member and the second arm of the second upper rotor member being arranged parallel to one another.

12. The rotary wing aircraft according to claim 9, wherein the hub plate is mounted to a portion of each of the upper rotor members of the upper rotor hub.

\* \* \* \* \*